United States Patent Office 2,865,962
Patented Dec. 23, 1958

2,865,962
PREPARATION OF 3-METHYL-1,2-CYCLOPENTANEDIONE

Lewis I. Krimen, Skokie, and Oscar L. Norman, Northbrook, Ill., assignors to International Minerals & Chemical Corporation, a corporation of New York No Drawing. Application November 20, 1957
Serial No. 697,543

10 Claims. (Cl. 260—586)

The present invention relates to synthetic flavoring materials, and more particularly to an improved method and means for the preparation of 3-methyl-1,2-cyclopentanedione.

3-methyl-1,2-cyclopentanedione is a white, crystalline material having a sweet, characteristic flavor reminiscent of walnuts, which has been employed as a flavoring additive in a variety of food products. DuPont and Urion prepared 3-methyl-1,2-cyclopentanedione by dehydrogenating divinyl glycol with copper (Compt. rend., 197, 158–59 (1935); C. A., 27, 5068[2] (1935)); Gault and Burkhard, by hydrolyzing dichloromethylcyclopentanone with boiling water (Compt. rend., 205, 1416–17 (1937); C. A., 32, 3135[4] (1938)); Litchenberger, by alkylating a metallic derivative of a diester of 2,3-cyclopentanedione-1,4-dicarboxylic acid, then hydrolyzing and decarboxylating (French Patent 839,062, March 23, 1939; C. A., 33, 8213[2] (1939). All of these methods suffer from one or more disadvantages, principally excessive cost of starting materials.

An object of the present invention is to provide an improved method for the preparation of 3-methyl-1,2-cyclopentanedione, starting with materials of relatively low cost.

We have discovered that 3-methyl-1,2-cyclopentanedione can be synthesized by reacting an alkyl acrylate with an alkali-metal salt of an alkyl alkoxalylpropionate under substantially anhydrous conditions, and decarboxylating the resulting cyclic compound.

The preparation of an alkyl alkoxalylpropionate in the form of its alkali-metal salt is conveniently carried out by a method described in Organic Syntheses (New York: John Wiley & Sons), collective volume 2, 1943, pages 272–3. In this method, a mixture of 1 mole of ethyl propionate and 1 mole of ethyl oxalate is added dropwise to a suspension of 1 mole of sodium ethoxide in 250 ml. of xylene maintained at ice-bath temperature. The resulting mixture can be used directly in our process, without isolation of the sodium salt of ethyl ethoxalylpropionate.

In one embodiment of our invention, 1 mole of ethyl acrylate is added dropwise at ordinary temperatures with agitation to a solution of the sodium salt of ethyl ethoxalylpropionate, prepared as described above. The materials react readily and rapidly, and the primary reaction product appears to cyclize spontaneously, splitting off ethanol. After the addition is finished, we ordinarily continue to agitate at ordinary or slightly elevated temperature (up to about 75° C., preferably between about 30 and about 50° C.) for a period of around 1 to 5 hours or more to insure that the reaction and the cyclization have proceeded as far as possible.

The crude cyclic compound obtained thereby is then commingled at ordinary or somewhat reduced temperature with one mole of hydrochloric acid, suitably in the form of the concentrated aqueous acid of commerce, or diluted with water to an HCl concentration around 10 to 30%, to convert the sodium salt into the free dicarbethoxy derivative of 3-methyl-1,2-cyclopentanedione. The result is a two-phase reaction product, in which the organic phase contains the desired material. The organic phase is decanted, washed several times with water, and is preferably distilled at reduced pressure to remove the solvent and unreacted materials. Ethyl ethoxalylpropionate and ethyl acrylate recovered in this way can be recycled if desired.

The distillation residue (ordinarily a heavy oil) is commingled with an excess of water (more than 2 moles per mole of the cyclic compound contained therein), acidified with hydrochloric acid, sulfuric acid, or other strong acid, and heated to a temperature between about 75° C. and the reflux level to effect hydrolysis and decarboxylation, around 1 to 10 hours being sufficient for this purpose. The reactions and conditions involved are closely analogous to a conventional acetoacetic ester decarboxylation. The treated material is homogeneous if the organic solvent was removed earlier. The reaction mixture is evaporated at reduced pressure to remove water and organic solvent (if any), and the residue is recrystallized from hot water. The crystals may be further purified if desired by sublimation. The product is substantially pure 3-methyl-1,2-cyclopentanedione.

In an alternative procedure, the two acid-treating steps are combined, the crude cyclic compound initially obtained being commingled directly with acid and water, then heated as described to effect more or less simultaneous conversion of the salt to the free cyclic compound, hydrolysis, and decarboxylation.

In another embodiment of the combined acid-treating steps, the crude cyclic compound is added directly to a body of the acid maintained at a temperature in the decarboxylation range. The opportunity for degradation of intermediates is thereby minimized.

The decarboxylation step employed in our invention is conventional, and it will be understood that conventional conditions may be employed therein. The acid, for example, can be any strong acid, preferably a strong mineral acid such as hydrochloric acid, sulfuric acid, phosphoric acid, or the like. An acid of the same class, preferably the same acid, can be used for the preceding acidification of the cyclic salt compound. The decarboxylation is preferably carried out at reflux temperature, ordinarily around 95 to 105° C. in the liquid phase.

When free alkyl alkoxalylpropionate is recycled or otherwise introduced into our process, it must be converted into the alkali-metal salt, or must be used under conditions which afford the salt in the initial reaction mixture. This is conveniently accomplished by adding the alkyl alkoxalylpropionate in combination with (or using it in conjunction with) an equimolar proportion of an alkali-metal alkoxide.

The reactions involved in the foregoing process are believed to be as follows, although we have not established the precise identity of the various intermediate compounds and it is to be understood that we do not wish to be bound by any particular theory of the invention:

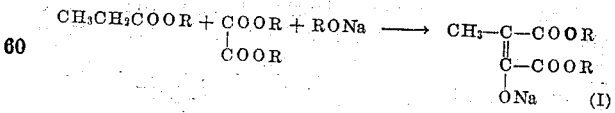

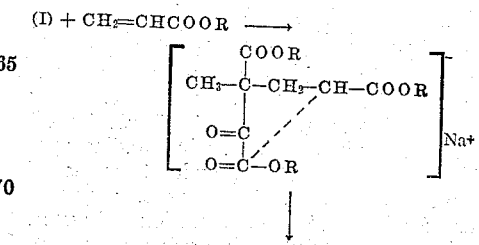

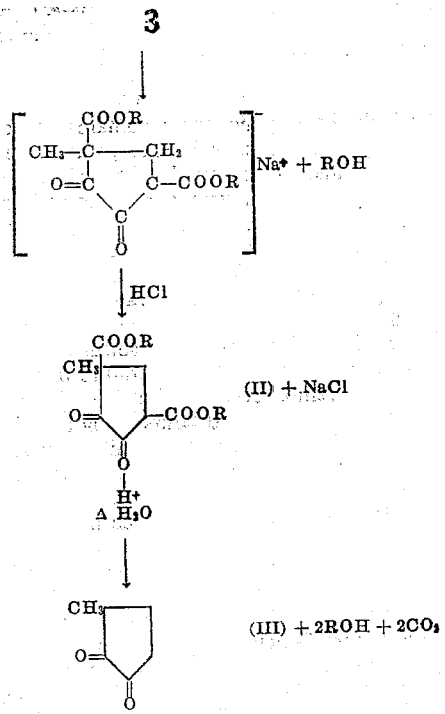

In carrying out the foregoing reactions, it is convenient and desirable to employ an organic solvent for the reactants to expedite contact thereof and to facilitate heat exchange. Such a solvent is ordinarily adopted for the first reaction and used throughout to facilitate recovery and recycle. The solvent should be essentially anhydrous, mobile, inert to the starting materials and products, and preferably of sufficiently low boiling point to permit it to be distilled off before the decarboxylation step. Such distillation before decarboxylation is desirable but ordinarily not essential, so long as the solvent does not react with the acid employed for decarboxylation and so long as it does not interfere with the recovery of the desired product. Inert organic liquids of many types can be used as solvents, including the normally liquid aliphatic hydrocarbons such as hexane, heptane, octane, cetane, and the like; the normally liquid aromatic hydrocarbons such as benzene, toluene, xylene, and the like; cyclopentane and alkyl-substituted naphthenes; aliphatic alcohols, such as ethanol, butanol, and the like; and others readily ascertainable from the art. We find the aliphatic ethers especially suitable, including ethyl ether, isopropyl ether, butyl ether, and the like.

In the foregoing description of our invention the terms "alkyl," "alkoxide" and "alkylate" are to be understood as including alkyl radicals and alkyl-containing radicals of from 1 to 7 carbon atoms, more particularly, methyl, ethyl, n-propyl, isopropyl, and the like, through heptyl, and position isomers thereof.

The following operating examples will more fully illustrate our invention:

Example 1

A mixture of ethyl propionate (1 mole, 102 g.) and ethyl oxalate (1 mole, 146 g.) was added dropwise to a suspension of sodium ethoxide (prepared from 1 mole, 23 g., of sodium) in 200 ml. of xylene in an ice bath. The completed mixture was stirred for 2.5 hr. at room temperature, during which time it became yellow in color and very thick, almost solid. Ethyl acrylate (1 mole, 100 g.) was then stirred in, and the mixture, green in color, was stirred at 30° C. for 2 hours. After standing over night, it was heated at 30–60° C. for 2.5 hr. with continuous stirring. After again standing over night, the mixture was commingled with 2 moles of concentrated hydrochloric acid. The organic layer was separated, washed with three 200-ml. portions of water, and stripped of water and xylene under reduced pressure. The residual oil was distilled at 1.25–0.5 mm. Hg, 55–95° C. vapor temperature, and 75 g. (0.629 mole) of ethyl ethoxalylpropionate were recovered. The residue (77 g.) was commingled with 100 ml. of a 50:50 mixture of concentrated hydrochloric acid and water, refluxed 2 hours, and stripped of water at reduced pressure. The residue was dissolved in hot water, treated with activated charcoal, filtered, evaporated under reduced pressure, cooled, and allowed to crystallize. The resulting crystals weighed 4 g. and analyzed as follows:

|  | Found | 3-Methyl-1,2-cyclopentane-dione |
|---|---|---|
| Melting point °C. [1] | 106–107 | 104.5 |
| C | 64.39 | 64.28 |
| H | 7.14 | 7.14 |

[1] With sublimation; uncorrected.

Example 2

A mixture of ethyl propionate (1 mole, 102 g.) and ethyl oxalate (1 mole, 146 g.) was added dropwise with stirring to a suspension of sodium ethoxide (prepared from 1 mole, 23 g., of sodium) in 200 ml. of ethyl ether in an ice bath. The completed mixture was allowed to stand over the week-end, during which time it solidified to a yellow mass. It was then heated slightly to permit stirring, and ethyl acrylate (1 mole, 100 g.) was added dropwise at room temperature. The completed mixture was refluxed (around 40° C.) for 4 hours, after which it was stirred for 2 additional hours and allowed to stand over night. Concentrated hydrochloric acid (100 ml.) was then added with agitation. The ether layer was decanted and washed three times with 200-ml. portions of water. The ether was stripped therefrom at reduced pressure, and the resulting concentrate was distilled at 0.5 mm. Hg. An oil boiling at 80–82° C. @ 0.5 mm. and weighing 49 g. was taken off; this appeared to be unconverted ethyl ethoxalylpropionate (0.243 mole). The distillation residue was an oil weighing 90 g. One-half of this material was commingled with 100 ml. of concentrated hydrochloric acid, refluxed 6 hours, and evaporated on a steam bath under reduced pressure to give a brown solid. The solid was decolorized by treatment with activated carbon in hot water, and 3 g. of 3-methyl-1,2-cyclopentanedione were recovered therefrom. Allowing for the recovered starting material, this corresponds to an overall yield of 15.3%.

While we have described our invention with reference to certain specific embodiments thereof, including specific process details, operating conditions, and manipulative techniques, it is to be understood that such matters are illustrative only and are not submitted by way of limitation. Numerous modifications and equivalents of the invention will be apparent from the foregoing description to those skilled in the art.

In accordance with the foregoing description, we claim as our invention:

1. A method for synthesizing 3-methyl-1,2-cyclopentanedione which comprises commingling an alkyl acrylate with an alkali-metal salt of an alkyl alkoxalylpropionate under substantially anhydrous conditions, allowing the resulting reaction product to cyclize, and hydrolyzing and decarboxylating the resulting cyclic compound, whereby 3-methyl-1,2-cyclopentanedione is obtained.

2. A method for preparing 3-methyl-1,2-cyclopentanedione which comprises commingling an alkyl acrylate with an alkali-metal salt of an alkyl alkoxalylpropionate in substantially anhydrous solution at a temperature below about 75° C. to effect reaction and cyclization thereof, acidifying the cyclized material with a strong aqueous acid, and heating to effect hydrolysis and decarboxylation thereof, whereby 3-methyl-1,2-cyclopentanedione is obtained, and recovering the 3-methyl-1,2-cyclopentanedione.

3. A method for preparing 3-methyl-1,2-cyclopentanedione which comprises commingling an alkyl alkoxalylpropionate with an equimolar proportion of an alkali-metal alkoxide and an equimolar proportion of an alkyl acrylate in substantially anhydrous solution, exposing the resulting mixture to a temperature below about 75° C. to effect reaction and cyclization thereof, acidifying the cyclized material with a strong mineral acid and heating under acid conditions in the presence of an excess of water to effect hydrolysis and decarboxylation thereof, whereby 3-methyl-1,2-cyclopentanedione is obtained, and recovering the 3-methyl-1,2-cyclopentanedione.

4. A process for the preparation of 3-methyl-1,2-cyclopentanedione which comprises commingling an alkali-metal salt of an alkyl alkoxalylpropionate with an equimolar proportion of an alkyl acrylate and an inert organic solvent in a substantially anhydrous system, exposing the resulting mixture to a temperature between about 30 and about 60° C. to effect reaction and cyclization thereof, acidifying the cyclized material with a strong mineral acid and heating under acid conditions in the presence of an excess of water to effect hydrolysis and decarboxylation thereof, and recovering the resulting 3-methyl-1,2-cyclopentanedione from the reaction product.

5. A method for preparing 3-methyl-1,2-cyclopentanedione which comprises commingling an alkyl alkoxalylpropionate sodium salt with an equimolar amount of an alkyl acrylate in an inert organic solvent, exposing the resulting mixture under substantially anhydrous conditions to a temperature between about 30 and about 60° C. to effect reaction and cyclization thereof, adding in excess of an equimolar amount of a strong mineral acid to the cyclized material to decompose the sodium salt and to acidify the material, refluxing the acidified material under acid conditions with an excess of water to effect hydrolysis and decarboxylation thereof, and recovering 3-methyl-1,2-cyclopentanedione from the reaction product.

6. A method as in claim 5 wherein said inert organic solvent is separated from the reaction mixture before decarboxylation.

7. A method as in claim 5 wherein unreacted alkyl alkoxalylpropionate and said inert organic solvent are separated from the reaction mixture before decarboxylation, and said unreacted alkyl alkoxyalylpropionate is recycled in conjunction with an equimolar proportion of sodium alkoxide to react with a further equimolar proportion of alkyl acrylate.

8. A method for preparing 3-methyl-1,2-cyclopentanedione which comprises commingling ethyl ethoxalylpropionate sodium salt with about an equimolar amount of ethyl acrylate in an inert organic solvent, exposing the resulting mixture under substantially anhydrous conditions to a temperature between about 30 and about 60° C. to effect reaction and cyclization thereof, commingling the reaction product with about one molar proportion of hydrochloric acid to decompose the sodium salt, separating the oil phase, distilling solvent and unreacted ethyl ethoxalylpropionate from said oil phase, acidifying the residue with hydrochloric acid and refluxing with an excess of water for about 1 to about 10 hours to effect hydrolysis and decarboxylation, and recovering 3-methyl-1,2-cyclopentanedione from the reaction product.

9. A method as in claim 8 wherein said inert organic solvent is ethyl ether.

10. A method as in claim 8 wherein said inert organic solvent is xylene.

No references cited.